United States Patent [19]

Barretto et al.

[11] Patent Number: 5,324,752
[45] Date of Patent: Jun. 28, 1994

[54] ION-EXCHANGE COMPOSITION EMPLOYING RESIN ATTACHMENT TO DISPERSANT AND METHOD FOR FORMING THE SAME

[75] Inventors: Victor B. Barretto, Santa Clara; Stephen S. Heberling, Mountain View; Vernon E. Summerfelt; Christopher A. Pohl, both of Union City, all of Calif.

[73] Assignee: Dionex Corporation, Sunnyvale, Calif.

[21] Appl. No.: 518,293

[22] Filed: May 3, 1990

Related U.S. Application Data

[63] Continuation of Ser. No. 315,506, Feb. 27, 1989, abandoned.

[51] Int. Cl.$^5$ ............................................. C08J 5/20
[52] U.S. Cl. .................................... 521/28; 521/30; 521/31
[58] Field of Search ........................... 521/28, 30, 31

[56] References Cited

U.S. PATENT DOCUMENTS

| | | | |
|---|---|---|---|
| 4,101,460 | 7/1978 | Small et al. | 521/28 |
| 4,376,047 | 3/1983 | Pohl | 521/28 |
| 4,447,559 | 5/1984 | Hanaoka et al. | 521/28 |
| 4,511,677 | 4/1985 | Horton et al. | 521/28 |
| 4,804,686 | 2/1989 | Regnier et al. | 521/28 |
| 4,920,152 | 4/1990 | Regnier et al. | 521/28 |
| 4,927,539 | 5/1990 | Stevens et al. | 521/28 |

FOREIGN PATENT DOCUMENTS 62-204853  9/1987  Japan.

*Primary Examiner*—Thurman K. Page
*Assistant Examiner*—P. Kulkosky
*Attorney, Agent, or Firm*—Flehr, Hohbach, Test, Albritton & Herbert

[57] ABSTRACT

In accordance with the present invention, an ion-exchange composition has been formed which comprises synthetic resin support particles, dispersant capable of suspending the support particles in an aqueous medium to inhibit or prevent agglomeration, and fine synthetic resin layering particles. In a preferred embodiment, the complex can be formed by contacting a suitable dispersant with monomer in an aqueous solution in which the monomer is insoluble. Under suitable conditions for suspension polymerization, the monomer will polymerize to form resin support particles having dispersant irreversibly attached to those particles. The dispersant is irreversibly attached to the synthetic resin support particles, either by covalent bonding or permanent physical entanglement. The dispersant is also attached to the fine layering particles, either by covalent bonding or electrostatic forces. The result is formation of a support particle-dispersant-layering particle complex.

12 Claims, No Drawings

ION-EXCHANGE COMPOSITION EMPLOYING RESIN ATTACHMENT TO DISPERSANT AND METHOD FOR FORMING THE SAME

This is a continuation of application Ser. No. 315,506 filed Feb. 27, 1989 now abandoned.

BACKGROUND OF THE INVENTION

The present invention relates to a composition which is useful for performing ion-exchange chromatography. More particularly, the present invention relates to an improved composition and method for preparing an ion-exchange composition in which resin support particles are irreversibly attached to fine resin layering particles via a dispersant material. The composition of the present invention can be used in conventional column chromatography but is most particularly suited for high performance liquid chromatography.

Generally, ion-exchange chromatography employs the use of columns. These columns are packed with a resin, often in the form of granules having sorptively active surfaces or surfaces which have been coated with a substance which is sorptively active.

It is well recognized in the art that excellent chromatographic supports consist of a plurality of discrete particles of regular shape, preferably spheres, having surfaces with a large number of superficial shallow pores. In order that columns will give reproducible chromatographic results, support granules ideally should be regular in their surfaces and their surface characteristics easily reproducible.

Materials for performing liquid chromatographic analyses are known where only the thin outer surfaces of the chromatographic support materials are available for actively exchanging ions with liquid media. For example, Small et al., in U.S. Pat. No. 4,101,460 (1978) describes the preparation and use of an ion-exchange composition comprising Component A, an insoluble synthetic resin substrate having ion-exchanging sites, at least on its available surface, and having Component B, a finely divided insoluble material, irreversibly attached thereto.

Small et al., in U.S. Pat. No. 4,252,644, describes the process for chromatographic separation of ions of like charge using the ion-exchange composition described in U.S. Pat. No. 4,101,460.

Iler, in U.S. Pat. No. 3,485,658 (1969), describes the preparation of chromatographic support materials where alternating layers of colloidal solid particles are laid down on a substrate by treating the substrate with dispersions of oppositely charged colloidal particles. These colloidal particles include alumina, silica, and ionic synthetic polymers.

Kirkland, in U.S. Pat. No. 3,505,785 (1970) discloses an improved process for performing chromatographic separation by contacting the materials to be separated with superficially porous refractory particles having impervious cores. These particles have a coating of a series of sequentially adsorbed like monolayers of like colloidal inorganic microparticles irreversibly attached thereto. The cores consist of glass spheres and the coating consists of monolayers of silica.

Horvath et al. describes ion-exchange chromatography using glass beads having a styrene-divinylbenzene resin skin, sulfonated or aminated to produce cation and anion exchange materials termed "pellicular resins," which refers to the skin-like layer of active sites on these beads. *Analytical Chemistry* 39:1422 (1967). These skin-like layers are physically held in place. In a pellicular resin, the support bead typically has a spherical annulus configuration with a stable resin layer deposited onto the surface of the beads. Since the support particles are usually smaller than 50 $\mu$m, making a uniform resin layer on their surface without agglomeration of the particles is difficult.

Hanakoa et al., in U.S. Pat. No. 4,447,559 (1984) discloses an ion-exchanger having resin support particles, a binder resin of the same or similar composition as the support resin, and fine synthetic resin particles with anion-exchange groups. Hanakoa requires amination of the binder. However, linear aminated polymer, an unavoidable by-product of binder amination, tends to agglomerate to the resin support particles. This can interfere with attachment of the fine resin particles to the binder, producing an insufficient coating of support particles by the fine resin particles.

All of the methods described above, except Horvath, et al. and Hanakoa, et al., involve a coating process in which the coating is attached to the resin support particles by electrostatic forces.

In the prior art electrostatic methods, the resin support particles are typically formed by a suspension polymerization process. A dispersant material is frequently used in polymerization of the resin support particles to maintain separate particles in the reaction solution as they are produced, preventing the desired size particles from sticking to each other and forming a larger agglomerate particle. The resin support particles are then lightly sulfonated by exposing them at room temperature to concentrated sulfuric acid for a few minutes. This creates a very thin layer of sulfonate sites on the surface of the resin support particle and allows for electrostatic attachment of fine resin layering particles such as aminated latex beads.

Thus, in the prior art electrostatic methods it is necessary to functionalize the fine layering particles by creating a positive or negative charge, at least at the surfaces of those particles, for the electrostatic attachment. This has been done by aminating or sulfonating latex-derived particles. If the latex is aminated, the resin support particles are sulfonated. In the case where the latex is sulfonated, the resin support particles are aminated. The latex and support particles are then brought into contact with each other, resulting in a monobead coat of latex particles electrostatically attached to the surface of the resin support particles. This produces a pellicular anion-exchange or pellicular cation-exchange resin bead.

The above-described methods of electrostatically attaching the synthetic fine resin layering particles to the resin support particles have many disadvantages. First, it is difficult to control the resin sulfonation step so that the degree of sulfonation is sufficient to allow complete coverage of the resin support particle with the electrostatically-attached latex, without having any residual cation-exchange capacity on the support particles. The residual cation-exchange capacity can lower the efficiency of the column.

In addition, linear aminated polymer, which is an unavoidable by-product of aminated latex preparation, tends to agglomerate to the resin support particles due to much higher diffusion rates over the much larger latex particles. The agglomeration of linear polymer can interfere with attachment of the latex particles to the resin support particles, producing an insufficient coating of the support particles by the latex particles. The result is a much lower than expected and non-reproducible ion-exchange capacity. Moreover, if oligomers or linear polymer is left in the resin support particle mixture after polymerization, when the prior art method of sulfonation of support particles is performed, these by-products are also sulfonated and are then free to interfere with the newly attached anion-exchange latex after latex agglomeration. This results in a low ion-exchange capacity as well.

In addition, some compositions cannot be agglomerated prior to packing of a column because they cannot withstand packing pressures. Therefore, the resin layering particle solution must be pumped through the packed column bed. With the electrostatic attachment method of the prior art, the column yield is poor due to unbalanced charge interaction between resin layering particles and resin support particles, thereby disrupting the packed bed.

The prior art methods of electrostatically attaching fine resin layering particles, such as latex, to resin support particles have additional limitations. In the prior art methods, it is necessary to maintain a dispersed latex suspension to prevent attachment of latex agglomerates to the resin support particles through the latex functionalization step. This limits the possible chemistries of functionalization to those that can be carried out in an aqueous system and which will not disrupt the latex suspension, thereby generating large clumps of agglomerates. Many of the larger, more aliphatic amines are not very water soluble and amination is normally carried out in a mixed water/solvent or nonaqueous system. These compounds cannot be used with the prior art method of electrostatic latex attachment.

In addition, it is not possible to use chemistries on agglomerated latex electrostatically attached to a support substrate that will reverse the charge on the latex, since the latex will no longer remain attached.

SUMMARY OF THE INVENTION

In accordance with the present invention, an ion-exchange composition has been formed which comprises synthetic resin support particles, dispersant capable of suspending the support particles in an aqueous medium to inhibit or prevent agglomeration, and fine synthetic resin layering particles. In a preferred embodiment, the complex can be formed by contacting a suitable dispersant with monomer in an aqueous solution in which the monomer is insoluble. Under suitable conditions for suspension polymerization, the monomer will polymerize to form resin support particles having dispersant irreversibly attached to those particles. The dispersant is irreversibly attached to the synthetic resin support particles either by covalent bonding or permanent physical entanglement. The dispersant is also attached to the fine layering particles, either by covalent bonding or by electrostatic forces. The result is formation of a support particle-dispersant-layering particle complex.

The novel ion-exchange composition can be made by forming a synthetic resin support particle-dispersant complex in which the dispersant is irreversibly attached to the support particles. The complex can then be mixed in aqueous slurry form with fine resin layering particles under conditions suitable to form a resin support particle-dispersant-resin layering particle complex in which the resin layering particles are irreversibly attached to the dispersant. In effect, the dispersant forms an irreversible bridge between the support and layering particles.

The dispersant of the present invention is irreversibly attached to the resin support particles. The dispersant contains ionic or potentially reactive functional groups that can be exploited through further chemistry after polymerization of the support particles.

The novel composition and method of the present invention has several advantages over that of the prior art. Since sulfonation of the resin support particles, required in most prior art methods, is eliminated by the method of the present invention, there is no interfering residual ion-exchange capacity on the resin support particles to interfere with chromatography.

The novel composition of the present invention employs attachment of dispersant to the support particles, by covalent bonding or permanent entanglement. Dispersant is attached to the layering particles of the present invention by covalent bonding or electrostatic forces. Attachment of layering particles to dispersant, either by covalent bonding, or electrostatically, by using an ionic dispersant attached to the surface of the support particles, prevents oligomers or linear polymer by-products from being sulfonated and interfering with attachment of the layering particles to the support particles. Thus, in the method and composition of the present invention these by-products remain neutral and can be washed away from the polymer suspension.

In the present invention, resin layering particles to be covalently attached, such as latex, can be pumped through the column and attached prior to functionalization of those particles. This results in a significant reduction in particle-particle interaction and disruption of the packed resin bed is minimal. As a consequence, column yield is much improved over the prior art methods of electrostatic attachment which resulted in unbalanced charge interaction between the layering and support particles, thereby disrupting the packed bed.

With the present composition and method, multiple layers of layering particles can be applied to the support particle-dispersant complex allowing more control over the column capacity. The novel composition and method of the present invention provides improved ion-exchange capacity and opens routes to functionalization and the use of functional groups in ion-exchange compositions previously unable to be employed in the prior art attachment methods.

DETAILED DESCRIPTION OF THE INVENTION

A. Ion-Exchange Composition

The ion-exchange composition of the present invention includes synthetic resin support particles, dispersant capable of suspending the support particles to inhibit or prevent agglomeration in an aqueous medium, and fine synthetic resin layering particles. The dispersant is irreversibly attached, either by covalent bonding or by permanent entanglement to the support particles, and either by covalent bonding or electrostatically to the layering particles.

The support particles may be formed from any synthetic resin material which is reactive with the particular dispersant of interest. For example, synthetic polymer ion-exchange resins such as poly(phenol-formaldehyde), polyacrylic, or polymethacrylic acid or nitrile, amine-epichlorohydrin copolymers, graft polymers of styrene on polyethylene or polypropylene, poly(2-chloromethyl-1,3-butadiene), poly(vinylaromatic) resins such as those derived from styrene, alpha-methylstyrene, chlorostyrene, chloromethylstyrene, vinyltoluene, vinylnaphthalene or vinylpyridine, corresponding esters of methacrylic acid, styrene, vinyltoluene, vinylnaphthalene, and similar unsaturated monomers, monovinylidene monomers including the monovinylidine ring-containing nitrogen heterocyclic compounds, and copolymers of the above monomers are suitable.

The support particles of the present invention can be formed by well known suspension polymerization techniques which involve suspending droplets of monomer in an aqueous medium in which it is insoluble. Under suitable conditions, the monomer will polymerize. This can be accomplished by mixing the monomer with additives, including dispersant and initiator in a suspension medium. When this medium is agitated, the monomer disperses into droplets and agitation continues until polymerization is complete. Preferably, the synthetic resins used are of the macroporous type which are well known in the art, particularly including styrene-divinylbenzene copolymer. The copolymer can be prepared, for example, according to the method of Ikada, et al., *Journal of Polymer Science*, Vol. 12, 1829–1839 (1974) or as described U.S. Pat. No. 4,382,124, to Meitzner, et al.

In a preferred embodiment, the resin support particles comprise beads of cross-linked polymer or copolymer, such as styrene-divinylbenzene copolymer, containing between about 0% to about 100% divinylbenzene monomer by weight. In its most preferred embodiment, the styrene-divinylbenzene copolymer contains between about 25% to about 80% divinylbenzene monomer by weight.

The layering particles of the present invention can be formed from synthetic resin, which is chosen to suitably react with a particular dispersant material and irreversibly attach to the dispersant at one of its functional groups. Preferably, the layering particles can be formed by emulsion polymerization and will be derived from a monomer mixture which is insoluble in the solvents with which they will be contacted. The polymerization can be performed by conventional emulsion polymerization techniques, such as by heating and stirring a suspension of monomers in a suitable solvent in the presence of a suitable emulsifying agent. Alternatively, the polymerization may be carried out by a suspension, bulk or solution process followed by grinding the resin to a desired size by mechanical means such as ball mills, rod mills or the like.

The fine resin layering particles may be formed of any well-known synthetic ion-exchange resin such as is described in connection with the synthetic resin support particles described above. Preferably, the layering particles will be formed of cross-linked polymers. The layering particles can be suitably formed from poly(vinylaromatic) resins, such as the copolymers styrene-divinylbenzene copolymer, divinylbenzene-vinylbenzylchloride copolymer, or methacrylate-vinylbenzylchloride copolymer.

The layering particles can be derived from a latex emulsion. In a preferred embodiment, the layering particles comprise a cross-linked polymer or copolymer containing about 0.25% to about 100% monomer by weight. In its most preferred embodiment, the layering particles comprise a crosslinked polymer or copolymer containing between about 1% to about 5% monomer by weight.

The dispersant material of the present invention is preferably chosen so that it contains functional sites which will irreversibly attach to both the support particles and layering particles. Depending on the support particles and layering particles selected, the dispersant may be any material which can inhibit or prevent agglomeration during suspension in the aqueous medium used for polymerization. For example, the dispersant can be selected from any one of the methacrylic acid copolymers, polymaleates, sulfonated polymers, polyvinylpyrrolidone esters, plant-based gums, lignins, and cellulose derivatives. In its most preferred embodiment, the dispersant of the present invention can be formed of polyvinylalcohol, sulfonated lignin, polyvinylpyrrolidine, gum arabic, gelatin, maleic acid-vinylacetate copolymer, or styrene-maleic anhydride copolymer. In a most preferred embodiment, the dispersant comprises between about 0.1% to about 25% dispersant by weight in water.

The irreversible attachment of a dispersant to the resin support particles can occur by covalent bonding via various mechanisms. One mechanism is by covalent bonding via a free radical polymerization reaction. Free radicals are typically generated in the resin support particle polymer being formed and sustain polymerization of the polymer as well as promote branching, the formation of new chains and bridging and cross-linking. An initiator can be utilized in the polymerization step of the resin support particle which starts and maintains the polymerization reaction. If the initiator concentration is high enough, more free radical sites are generated than can be consumed in the polymerization reaction, and other chemical species that are present, such as dispersant, can react with them. Thus, the dispersant can covalently link to the resin substrate particle polymer. For example, it has been suggested that polyvinylalcohol dispersant can become covalently linked to another polymer if the initiator concentration is high enough. Ikada et al., *Journal of Polymer Science*, Vol. 12, pp. 1829–1839 (1974). While studying the process of particle formation during suspension polymerization, it was observed that polyvinylchloride can be chemically grafted to the dispersant. Kirk et al., *Encyclopedia of Chemical Technology*, 3rd Ed., Vol. 23, pp. 888–890 (1983). However, no suggestion has been made to link dispersant to resin support particles and/or resin layering particles to provide an improved ion exchange composition.

A second method of irreversible attachment of dispersant to the resin support particle can be by permanent physical entanglement. In this mechanism, relatively small polymers, such as sulfonated lignin dispersant or polyvinylalcohol dispersant can become permanently entangled with the resin support particle polymer as the polymerization occurs. Although heterogeneous polymer mixtures which are "permanently entangled" have been described by Hatch, M., *Industrial and Engineering Chemistry*. Vol. 49, No. 11, p. 1812 (1957), the entanglement of dispersant in a polymer system has not previously been described or demonstrated.

The irreversible attachment of dispersant to the resin layering particles can occur by covalent bonding, such as described previously herein, or by electrostatic forces. For example, the resin support particle can be made of styrene-divinylbenzene copolymer and the dispersant can be a mixture of sulfonated lignin and gum arabic dispersant. The fine resin layering particles can be formed of an aminated latex such as divinylbenzene-vinylbenzylchloride copolymer. The sulfonated lignin can irreversibly attach to the resin support particle either by covalent bonding or permanent entanglement thereby providing a negatively charged surface to which the layering resin particles can be agglomerated electrostatically.

Electrostatic attachment has two main advantages. First, it eliminates the sulfonation step previously required in the prior art after the resin support particle polymer was formed. Further, the measurable residual cation-exchange capacity is much lower with the present method of electrostatic attachment of the layering particle to the dispersant than with active sulfonation of the resin support particle surface. It was previously not possible to control the resin support particle sulfonation step so that the degree of sulfonation was enough to have complete coverage of the resin particle with electrostatically attached layering particles such as latex, without having significant residual cation-exchange capacity.

B. Method of Preparing Ion-Exchange Compositions

The novel ion-exchange composition is prepared by irreversibly attaching the dispersant to both the synthetic resin support particles and to the fine resin layering particles in such a manner that the dispersant is positioned between the support particles and layering particles. This may be accomplished by contacting the dispersant with monomer in an aqueous solution in which the monomer is insoluble. Under conditions suitable for suspension polymerization, the monomer will polymerize to form resin support particles having dispersant irreversibly attached to those particles, either covalently or by permanent entanglement. Thus, a synthetic resin support particle-dispersant complex will be formed. The synthetic resin support particle-dispersant complex may then be contacted in aqueous solution with the fine resin layering particles. Under suitable reaction conditions, a resin support particle-dispersant-resin layering particle complex is formed in which the resin support particles and resin layering particles are irreversibly attached to the dispersant.

The term "irreversibly attached" as used herein means that most particles of dispersant will not be displaced from attachment to either the resin support particles or resin layering particles by solutions of strong electrolytes, or by shearing forces created such as when a liquid is passed through an ion-exchange bed using the novel composition of the present invention. "Irreversibly attached" as used herein includes attachment of the dispersant to the resin support particles by covalent bonding or permanent entanglement. "Irreversibly attached" as used herein also includes attachment of dispersant to fine resin layering particles by covalent bonding or electrostatic forces. "Irreversible attachment" excludes solely physical sorption.

1. Electrostatic Attachment

The novel ion-exchange composition can be used in a conventional ion-exchange column. The ion-exchange column can be formed by polymerizing a suitable monomer in the presence of dispersant, whose functional group will react with the monomers, thereby irreversibly attaching the dispersant to the resulting polymer forming the resin support particles. The support particle-dispersant complex can be formed into a slurry in a nonsolvent liquid and packed into a column. The fine resin layering particles are then functionalized, either by amination or sulfonation. The suspension of fine resin layering particles can then be passed through the column. By monitoring the column effluent stream for breakthrough of fine resin layering particles, such as a latex derived particle, the completion of formation of the resin support particle-dispersant-resin layering particle complex can be determined.

Electrostatic attachment can alternatively be accomplished as follows. The resin support particle-dispersant complex can be formed as described above. Once that complex is formed, the fine resin layering particles, such as latex-derived particles, can be aminated. The aminated latex can then be mixed with the resin support particle-dispersant complex under suitable conditions. Preferably, the reactants are mixed at a temperature of between about ambient to 40° C. in an aqueous slurry so that an excess of layering particles is present.

2. Covalent Attachment

For irreversible attachment of dispersant to the support particles by covalent bonding, the support particle-dispersant complex can be prepared as described above. In the covalent attachment method, the attachment of dispersant to the neutral layering particles can then be performed, preferably by heating a mixture of support particle-dispersant complex and layering particles in an aqueous medium to a temperature in the range of between about 50° C. to about 70° C. for between three and ten hours.

Once the resin layering particles are attached to the complex, a suspension is no longer required. The complex can be subjected to any conditions necessary for functionalization that do not degrade the fine resin layering particles, the resin support particles, or the covalent bonds formed between the dispersant and these particles.

The resin support particle-dispersant-resin layering particle complex can then be functionalized for use in ion-exchange chromatography. This can be accomplished by forming ion-exchange sites, at least at the surface of the layering particles, but preferably throughout those particles. This can be done by contacting the complex with a compound in a fluid medium which will aminate the fine resin layering particle, for example, by contacting the complex with ethyldimethylamine. The amination can be performed by heating the mixture of resin support particle-dispersant and aminated latex to a temperature range of about 30° C. to about 50° C. for between one and four hours.

C. Ion-Exchange Process

The ion-exchange composition of the present invention is particularly useful as packing material for columns to chromatographically separate ionic species of opposite charge in a solution by differential retention on the column. This can be accomplished by contacting such a solution with a chromatographic column including a packed bed of ion-exchange particles formed of the composition of the present invention. The ion-exchanging sites on the particles attract the ions to be removed from solution.

Preferably, the layering particles have a median diameter ranging from 0.002 to 0.08 microns, while the ratio of median diameters of support particles to layering particles ranges between 100 to 1, and 5,000 to 1, as described in U.S. Pat. No. 4,376,047 to Pohl (1983).

The resin support particles and fine resin layering particles are selected so that the ion-exchanging sites on the outer surfaces of the resin layering particles are sites that will exchange their ions for the ionic species which are to be removed from solution. Therefore, the composition can be prepared so that it has either cation- or anion-exchanging sites on the fine resin layering particles, depending on the nature of the ions desired to be removed from solution.

The sizing of support particles and layering particles can be important in the efficiency of an ion-exchange column using the composition of the present invention. The use of extremely fine layering particles, in combination with the use of smaller substrate particles produces an optimum combination of increased efficiency without increasing the capacity of the column. It is important for certain chromatographic separations that the improvement in efficiency caused by use of smaller support particles not be accompanied by increased capacity, which will occur if the layering particles are maintained at a constant size. The advantages of simultaneously reducing the size of the layering particles and support particles include a high degree of flexibility in flow rates, resolution, and resolution times due to the high efficiency of such a column.

Accordingly, the ionic species to be resolved is passed through the column wherein the different ions are separated due to different degrees of attraction by the ion-exchange sites on the packing material. To remove the ions from the column, an eluent, also attracted to such sites, is passed through the column to drive the ions so that they may be collected for analysis. Typically, these eluents have the same charge as the ions to be resolved and are a different chemical type.

The ranges of eluents to be employed, their flow rates and parameters of the ion-exchange chromatography are well known to those skilled in the art.

As discussed in U.S. Pat. No. 4,376,047, it has been found that a reduction in size of the substrate particles includes improved efficiency of chromatographic separation. If the layering particles are maintained at a constant size, the capacity of the column increases to a point where it would have a detrimental effect on use in a system such as described in Small et al., U.S. Pat. No. 3,920,397. That system relates to a first chromatographic separation column, followed by a suppressor column which removes the chromatography developing reagent in ionized form, so that the ions of interest may be measured by a conductivity meter without interference from the developing reagent. The separator column must have a low capacity so that the suppressor column is capable of a useful lifetime. Thus, the solution to the problem of increasing chromatographic efficiency, without unduly increasing capacity is to reduce simultaneously the size of the layering particles and the support particles.

For example, for a difficult separation where the objective is to achieve sharper peaks and, therefore, a higher resolution, one can reduce the support and layering particles in the above ranges with identical flow rates and resolution times. If one wishes to maintain the same resolution but reduce the run time, a faster flow rate can be employed with the composition of the present invention because of the greater efficiency of such particles.

EXAMPLE 1-Preparation of Resin Support Particle - Dispersant Complex (Covalent or Permanent Entanglement)

A solution of 20 grams of 75 percent benzoyl peroxide in a mixture of 230 grams of commercial divinylbenzene (containing 55% of actual divinylbenzene) and 230 grams commercial vinyltoluene was dispersed in the form of fine droplets in 1600 ml of an aqueous solution containing water and 8 grams of polyvinylalcohol (Polysciences Inc. #4398). The whole mixture was protected from air by maintaining an atmosphere of nitrogen within the reaction vessel. The mixture was heated to 80° C. and held at this temperature for twenty hours during which time polymerization took place. Liquid was drained from the resin and the resin particles were washed with water to remove water soluble products and drained. There remained 368 grams of white opaque polymer in the form of spherical particles.

EXAMPLE 2-Preparation of Latex Derived Layering Particles - (Cationic Surfactant)

A mixture of 26.8 grams commercial vinylbenzylchloride and 1.8 grams commercial divinylbenzene (containing 80 percent actual divinylbenzene) was added to 100.25 grams of aqueous solution containing water, 10 grams 0.1M hydrochloric acid, 0.75 grams of Wako VA-044 (2,2'-azobis (N,N'-dimethyleneisobutyramidine) dihydrochloride and 1.0 gram benzyl dimethyl dodecyl ammonium bromide. The whole mixture was placed in a 16 oz. narrow neck bottle and deairated with nitrogen for five minutes. The bottle was capped and tumbled in a water bath held at 46° C. for 5 hours to complete the polymerization. The white opaque mixture was filtered through a GF/A filter to remove any coagulum from the 125 grams of latex. Then 0.625 grams of benzyl dimethyl dodecyl ammonium chloride was added to the latex to stabilize it.

EXAMPLE 3-Preparation of Latex Derived Layering Particles-(Anionic Surfactant)

A mixture of 27.5 grams of commercial vinylbenzylchloride and 1.5 grams of commercial divinylbenzene containing 80% of actual divinylbenzene was added to 200 grams of aqueous solution containing water, 0.84 grams sodium bicarbonate, 1.68 grams of potassium persulfate, 14 grams of a 10% aerosol MA solution (sodium dihexyl sulfosuccinate), and 6 grams of a 10% sodium metabisulfite solution. The whole mixture was placed in a 16 oz. narrow neck bottle and deairated with nitrogen for five minutes. The bottle was capped and tumbled in a water bath held at 32° C. for 5 hours to complete the polymerization. Then 50 grams of a 25% Triton X-100 (ethoxylated nonylphenol) solution was added to the latex to stabilize it. The white opaque mixture was filtered through a #4 filter paper to remove any coagulum from the 280 grams of latex. The latex was functionalized by adding 217 ml. of 1M dimethylethylamine to the 280 grams of latex and stirring the mixture for 4 hours at room temperature.

EXAMPLE 4-Latex Attachment to Resin Support Particles and Functionalization-(Covalent-Anion Two-Step Method)

A mixture of 16 grams of a 25% by weight resin slurry in water as prepared in Example 1 and 40 grams of 0.1M sodium hydroxide was added to 40 grams of stabilized latex from Example 2. The whole mixture was heated to 50° C. for two hours. The liquid was drained from the resin and the resin washed with water containing 0.25% by weight of Triton X-100 (ethoxylated nonylphenol) to remove excess latex. To the 4 grams of resin, 60 grams of 1M ethyldimethylamine was added. This mixture was heated to 40° C. for two hours. The liquid was drained from the resin and the resin washed with water. The 4 grams of resin was added to 26 grams of 0.5M sodium hydroxide to make a slurry for packing into a 250 mm length by 4 mm id. column.

The column, with an appropriate end fitting and bed support, was attached to the bottom of a heated 60° C., vertical tube. The tube was filled with the 30 gram mixture of resin and 0.5M sodium hydroxide and pressurized to 6000 psi for five minutes. The column was removed from the vertical tube after reducing the pressure and an appropriate end fitting and bed support were attached to the open end of the column. The resin capacity was 96.6 µeq. per gram.

EXAMPLE 5-Latex Attachment to Resin Support Particles and Functionalization (Covalent-Anion One-Step Method)

A mixture of 16 grams of 25% by weight resin (as prepared in Example 1) in water and 40 grams of 0.1M sodium hydroxide was added to 40 grams of stabilized latex. To this mixture of resin and latex, 60 grams of 1M ethyldimethylamine was added. The whole mixture was heated for two hours at 60° C. The liquid was drained from the resin and the resin was washed with water. The washed resin was combined with 26 grams of 0.5M sodium hydroxide to make a column packing slurry. The column was packed as in Example 4. The resin capacity was 37 µeq. per gram.

EXAMPLE 6-Preparation of Resin Support Particle-Dispersant-Resin Layering Particle Complex Using Latex Acrylate A solution of 259.01 grams water, 40.12 grams 22% CA890 (ethoxylated octylphenol) (consisting of 8.83 grams actual CA890), and 0.41 grams potassium persulfate was placed in a bottle and deairated with nitrogen for five minutes. A mixture of 54.07 grams glycidyl methacrylate, and 6.02 grams diethyleneglycolmethylmethacrylate was added to the solution in the bottle and the whole mixture was deairated with nitrogen for five minutes. To the whole mixture, a solution of 9.82 grams water and 0.40 grams of sodium metabisulfite was added. The bottle was capped and tumbled at 32° C. for 2 hours. The latex was then filtered through a Whatman 541 filter to remove any coagulum.

EXAMPLE 7-Preparation of Support Particle -Dispersant-Layering Particle Complex and Functionalization (Covalent Anion)

A mixture of 4 grams substrate resin (as in Example 1), 16 grams latex (as prepared in Example 6) and 2 grams 0.1M hydrochloric acid was heated to 90° C. for seven hours. The excess liquid was removed from the resin and the resin was washed with water to remove water-soluble residue. The washed resin was combined with 20 grams of 1M ethyldimethylamine and heated at 50° C. for two hours. The excess liquid was removed from the resin and the resin was washed with water to remove water-soluble residue. The resin was mixed with 26 grams 0.5M sodium hydroxide in preparation for packing a column as described in Example 4. The resin capacity was 42.9 µeq. per gram.

EXAMPLE 8-Preparation of Support Particle -Dispersant-Layering Particle Complex (Covalent Cation)

A mixture consisting of 16 grams of 25% by weight aqueous resin slurry (as prepared in Example 1), actually containing 4 grams of resin and 40 grams of 0.1M sodium hydroxide was added to 4 grams of stabilized latex (as prepared in Example 2). This whole mixture was heated at 50° C. for two hours. The excess liquid was removed and the resin washed with water to remove any water-soluble reactants.

The washed resin was added to a mixture consisting of 16 grams thiourea, 137 grams water and 23 grams 0.5M sodium hydroxide. The entire mixture was heated at 60° C. for 16 hours. The liquid was removed and the resin washed with water to remove any excess thiourea.

A solution of 8 grams 30% hydrogen peroxide (containing 2.4 grams actual 100% hydrogen peroxide) and 8 grams glacial acetic acid was added to the washed resin. The whole mixture was kept at 22° C. for 24 hours. The solution was removed from the resin, followed by washing the resin with water to remove the water-soluble products.

The 4 grams of resin was mixed with 26 grams 0.5M sodium hydroxide to make a slurry for column packing. The column was packed as in Example 4. The capacity was 67.8 µeq. per gram.

EXAMPLE 9-Preparation of Sulfonated Latex (Cation)

A solution of 350 grams water and 0.1 grams calcium chloride dihydrate was placed in a bottle and deairated for five minutes with nitrogen. A mixture of 21.66 grams of styrene, 1.42 grams commercial 80.5% divinylbenzene (containing 80.5% divinylbenzene), 0.14 grams of Vazo 33 (2,2'-azobis (2,4-dimethyl-1-4-methoxyvaleronitrile), 3.66 grams of Atlox 3403 F (blend of anionic and nonionic surfactants) and 1.09 grams Atlox 3404 F was added to the deairated solution. The bottle was capped and tumbled at 32° C. for 17 hours. Then 22 grams of Igepal DM880 (ethoxylated dialkylphenol) was added to the whole mixture in the bottle and the bottle capped and tumbled for 24 hours at 32° C. The contents of the bottle were then filtered using Whatman's GF/A, GF/D and GF/F filters to remove any coagulum from the latex.

The latex was sulfonated by adding 92.4 grams of concentrated sulfuric acid to 20 grams of the filtered latex using an addition funnel. Then 137 grams of chlorosulfonic acid was added to the latex-sulfuric acid mixture using the addition funnel. The entire mixture of latex, sulfuric acid and chlorosulfonic acid was heated at 110° C. for 2 hours. The mixture was cooled to 60° C. and, using an addition funnel, was added to 1800 ml. of 3.22M sodium hydroxide to quench the sulfonation of the latex. The quenched latex was filtered using a Whatman #541 filter to remove coagulum.

EXAMPLE 10-Preparation of Support Particle -Dispersant-Layering Particle Complex (Covalent Cation)

A paste was formed by combining 4 grams resin substrate (as in Example 1) with 4 grams glycidyl trimethyl ammonium chloride, 2 grams water, and 0.59 of 0.1M hydrochloric acid. The whole combination was heated at 90° C. for seven hours. The resin was then washed with water to remove the water-soluble reactants. To the washed resin, 20 grams of latex as prepared in Example 9 was added. This mixture was stirred for 30 minutes. The excess liquid was removed and the resin washed to remove any excess latex.

The washed resin was combined with 26 grams 0.5M sodium hydroxide and packed as in Example 4. The resin capacity was 2.6 µeq. per gram.

EXAMPLE 11-Preparation of Support Particle -Dispersant-Layering Particle Complex (Electrostatic)

A substrate resin was made with 21 grams each of a Marisperse (sulfonated lignin) dispersant and gum arabic dispersant, (Resin #007-88-9p) as in Example 1. A mixture was prepared of 4 grams of the Marisperse dispersant resin, 11 grams water, 1.8 grams 0.5M sodium hydroxide and 15 grams of latex from Example 3 (an anionic surfactant latex). The whole mixture was heated at 50° C. for one hour. The excess liquid was removed from the resin and the resin washed with water to remove water-soluble reactants. The resin was mixed with 26 grams of 0.5M sodium hydroxide for packing a column as in Example 4. The resin had a capacity of 80.5 μeq. per gram.

We claim:

1. A method of producing an ion-exchange chromatographic composition for use in ion exchange chromatography, said method comprising the steps of:
   (a) polymerizing a vinyl monomer by free-radical suspension polymerization in an aqueous medium in which said monomer is insoluble to form synthetic resin support particles, said polymerization being performed in the presence of a polymeric dispersant which inhibits or prevents agglomeration of said support particles, and forming a synthetic resin support particle-dispersant complex in which said dispersant is irreversibly attached to said support particles; and
   (b) mixing said complex of step (a) in aqueous slurry form with fine resin layering particles having a size at least 0.002 microns under conditions suitable to form a resin support particle-dispersant-resin layering particle complex in which said resin layering particles are irreversibly attached to said dispersant, the size of the substrate particles and layering particles, and the size ratio between them, being selected to form ion-exchange chromatographic compositions useful as the ion-exchange resin medium in a separation column of an ion chromatography system, the resin support particle-dispersant-resin layer particle complex being unsulfonated.

2. The method of claim 1 wherein said dispersant is selected from the group consisting of polyvinylalcohol, sulfonated lignin, polyvinylpyrrolidone, gum arabic, gelatin, maleic acid-vinylacetate copolymer, and styrene-maleic anhydride copolymer.

3. The method of claim 1 wherein said dispersant is irreversibly attached to said resin layering particles by covalent bonding.

4. The method of claim 1 wherein said dispersant is irreversibly attached to said synthetic support particles by covalent bonding.

5. The method of claim 1 wherein said dispersant is irreversibly attached to said synthetic support particles by permanent physical entanglement.

6. The method of claim 1 wherein said dispersant is irreversibly attached to said fine resin layering particles by electrostatic forces.

7. The method of claim 6 wherein said fine resin layering particles comprise aminated resin layering particles.

8. The method of claim 1 wherein said dispersant is selected from the group consisting of methacrylic acid copolymers, polymaleates, sulfonated polymers, polyglycerol esters, plant-based gums, lignins, and cellulose derivatives.

9. The method of claim 1 wherein said fine synthetic resin layering particles are derived from a latex.

10. The method of claim 1 wherein said synthetic resin support particles are macroporous.

11. The method of claim 1 further comprising the step of:
   (c) functionalizing said complex of step (b) of claim 10 by forming ion-exchanging sites at the surfaces of said fine resin layering particles in a fluid medium.

12. An ion-exchange chromatographic composition produced by the method of claims 1 or 2.

* * * * *